United States Patent [19]

Carlson

[11] 4,426,193
[45] Jan. 17, 1984

[54] IMPACT COMPOSITE BLADE

[75] Inventor: Robert G. Carlson, Cincinnati, Ohio

[73] Assignee: The United States of America as represented by the Secretary of the Air Force, Washington, D.C.

[21] Appl. No.: 227,319

[22] Filed: Jan. 22, 1981

[51] Int. Cl.³ .............................................. F01D 5/28
[52] U.S. Cl. ............................... 416/229 A; 416/230; 416/241 A
[58] Field of Search ........... 416/229 A, 228 R, 229 R, 416/230 R, 230 A, 241 A

[56] References Cited

U.S. PATENT DOCUMENTS

| | | | |
|---|---|---|---|
| 2,423,700 | 7/1947 | Hardy | 416/229 |
| 3,667,108 | 6/1972 | Schmidt | 416/230 |
| 3,679,324 | 7/1972 | Stargardter | 416/229 |
| 3,751,181 | 8/1973 | Hayashi | 416/241 A X |
| 3,762,835 | 10/1973 | Carlson et al. | 416/230 X |
| 3,883,267 | 5/1975 | Baudier et al. | 416/230 |
| 3,915,781 | 10/1975 | Novak et al. | 416/230 X |
| 4,000,956 | 1/1977 | Carlson et al. | 416/229 A X |
| 4,022,547 | 5/1977 | Stanley | 416/230 |
| 4,043,703 | 8/1977 | Carlson | 416/230 |
| 4,071,184 | 1/1978 | Carlson et al. | 228/159 |
| 4,111,600 | 9/1978 | Rothman et al. | 416/2 |
| 4,118,147 | 10/1978 | Ellis | 416/230 |

Primary Examiner—Harvey C. Hornsby
Assistant Examiner—Christine A. Peterson
Attorney, Agent, or Firm—Donald J. Singer; Frank J. Lamattina

[57] ABSTRACT

The top portion of a composite (boron filament-/aluminum matrix) blade which is useable in a fluid flow machine is made more resistant to impact energy by forming a cavity in the boron filament layer of the tip portion of each laminate (or ply) of the blade, then filling each cavity with a resin, and then bonding together the laminates with the resin-filled cavities therein.

1 Claim, 5 Drawing Figures

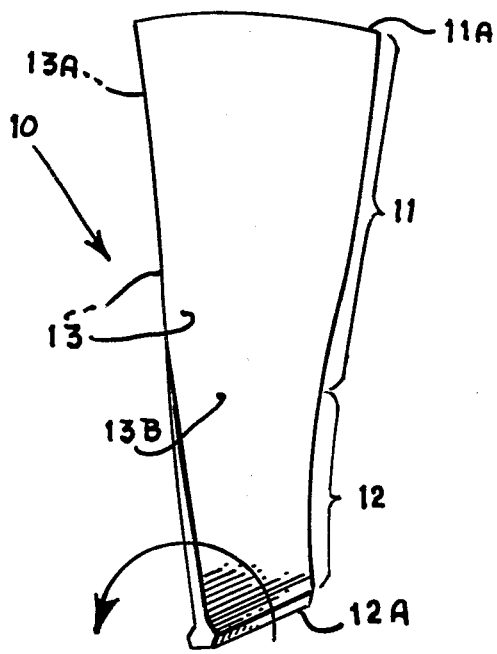
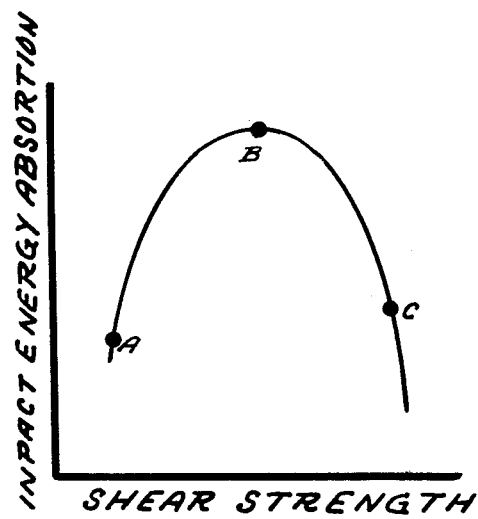
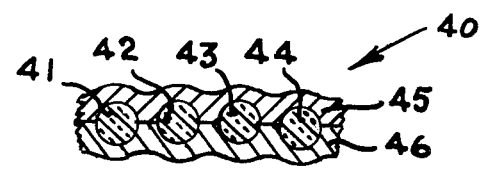
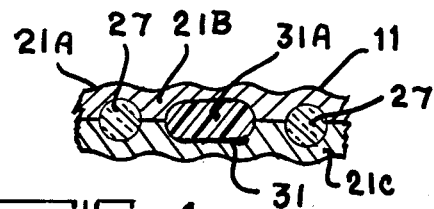
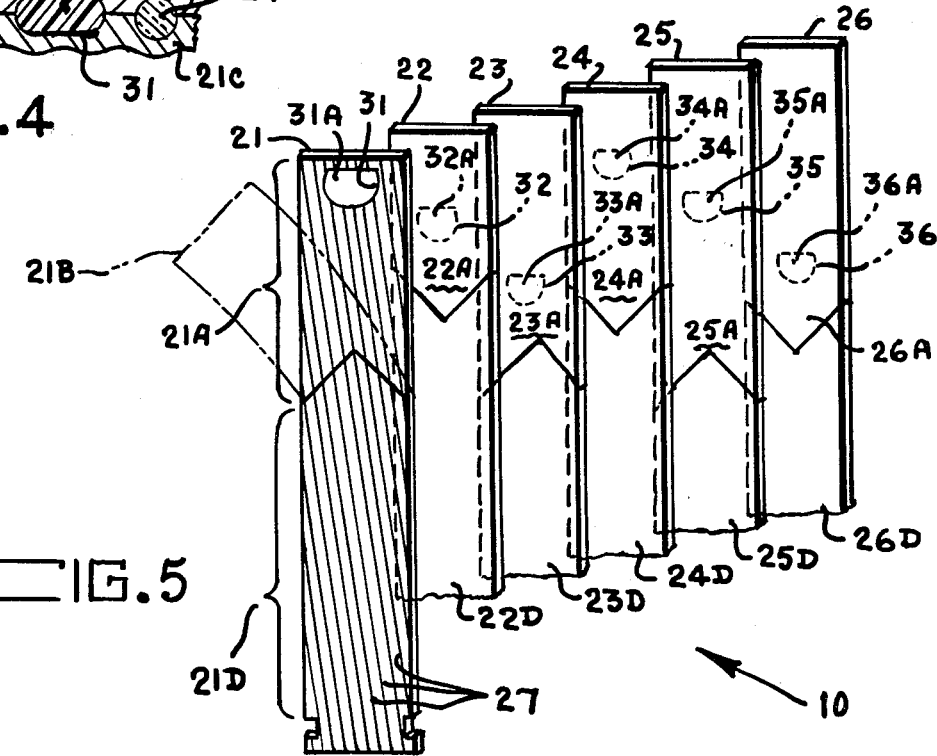

IMPACT COMPOSITE BLADE

STATEMENT OF GOVERNMENT INTEREST

The invention described herein may be manufactured and used by or for the Government for governmental purposes without the payment of any royalty thereon.

BACKGROUND OF THE INVENTION

This invention relates to a composite blade for use in a fluid flow machine and, more particularly, to a uniquetip portion thereof which has great impact absorption capability.

Many problems have confronted efforts to utilize filament reinforced composites, such as a composite gas turbine engine compressor blade; and, a majority of these problems have been overcome. However, one major obstacle which as yet has not been overcome is the inability of the composite to survive foreign object damage (e.g., bird strikes) by adequately deforming in a manner to absorb the impact energy.

It is here to be noted that a significant approach to impact resistance of composite blades is set forth in U.S. Pat. No. 4,000,956, U.S. Pat. No. 4,043,703, and U.S. Pat. No. 4,071,184 issued to the applicant. Therein impact resistance is improved by the suitable selection of relative intraply and interply bond strengths in a "bi-metal blade".

It is fair and accurate to say that, despite the teachings of the aforementioned patents, what is still needed in the art, and is not available, is a composite blade (or, more accurately, a composite tip portion thereof) which will more fully utilize the impact absorbing potential of composite materials, such as are used in a composite blade.

SUMMARY OF THE INVENTION

This invention provides a composite blade, and more specifically a tip portion thereof, that fulfills the above-mentioned need. In addition, this invention provides a method of making the unique tip portion of the composite blade. Therefore, this invention constitutes a significant advance in the state-of-the-art.

Accordingly, an object of this invention is to provide a composite blade which will more fully utilize the impact absorbing potential of composite materials.

Another object of this invention is to provide a composite blade tip portion which has greater impact absorption capability than prior art composite blade tip portions.

Still another object of this invention is to teach the fundamental steps of an improved method of making the aforementioned composite blade tip portion.

These objects of this invention, as well as other related objects thereof, will become readily apparent after a consideration of the description of the invention, together with reference to the contents of the Figures of the drawing.

DESCRIPTION OF THE DRAWING

FIG. 1 graphically depicts the impact energy absorption of a composite article as a function of its shear strength;

FIG. 2 is a perspective view, in simplified form, of a composite gas turbine engine compressor blade embodying the present invention;

FIG. 3 is a top view, in cross section and in simplified schematic form, of a prior art single composite laminate or ply;

FIG. 4 is a top view, in cross section and in simplified schematic form, of a single composite laminated or ply of the inventive blade and tip section thereof; and FIG. 5 is an exploded view, in simplified form, of several blade laminates or plies that are made in accordance with the method taught herein.

DESCRIPTION OF THE PREFERRED EMBODIMENT

As a preliminary matter, and with reference to FIG. 1, therein total impact absorption of a composite article (which is bonded as will be described later herein) is plotted as a function of shear strength (which is a measure of degree of bonding). It is to be noted that the curve in FIG. 1 represents the locus of points describing the impact absorption versus shear strength for any particular set of materials, and it is recognized that a similar family of curves would represent other filament composite material combinations.

On the low shear strength side (positive slope) of FIG. 1 (i.e., point A) the filaments and individual laminates are free to move about, much in the manner of a deck of cards, and consequently absorb an extensive amount of impact energy.

As bonding (shear strength) increases, the composite article exhibits higher impact strength (i.e., point B).

Further bonding (actually, overbonding) causes the filaments to fracture easily in the deformation cycle, thereby absorbing only a limited amount of impact energy and behaving as a brittle material (i.e., point C).

Thus, it clearly becomes advantageous to make a composite article, such as a gas turbine blade (and tip portion thereof), with an optimized impact energy absorption potential typified by point B, FIG. 1.

With reference to FIG. 2, therein is shown a preferred embodiment 10 of a composite blade made and structured in accordance with this invention. The blade 10 comprises a tip portion 11 with a tip end 11A, a root portion 12 with a root end 12A, and an airfoil 13 with a pressure surface 13A and a suction surface 13B. Also shown in FIG. 2, to better orient the reader, is the direction of rotation of the blade 10, assuming that it is one of a plurality of blades mounted on, and retained by, a rotatable disc or hub (not shown) in the conventional manner.

With reference temporarily to FIG. 5, the blade comprises a plurality of laminates (such as representative ones 21-26, inclusive), of elongated continuous filaments (such as are similarly designated 27), having high strength and high modulus of elasticity, that are embedded in a lightweight matrix. The laminates in plies 21-26, inclusive, are laid and bonded together in essentially parallel relationship to each other to form the airfoil 13 of the blade 10.

With reference to FIG. 3, therein is shown, in a simplified cross sectional top view, a representative prior art single composite laminate or ply 40. It is to be remembered that a plurality of those laminates bonded together comprise a representative prior art composite blade. In the representative single laminate 40 there is a single layer of a plurality of elongated boron filaments (such as 41-44, inclusive) which are sandwiched between two layers or foils of metal (such as 45 and 46), with these foils 45 and 46 conforming to the shape of the boron filaments and comprising a matrix for the filaments 41–44, inclusive. The filaments and the metal foils are bonded together, such as by a diffusion process, to form the unitized laminate 40. It is here to be noted and to be remembered that the constituents of the laminate 40 comprise, in fact, the root portion 12 of my inventive composite blade 10, FIG. 2.

With reference to FIGS. 1, 4 and 5, the tip portion 11 of my blade 10, comprises in the most basic and generic structural form a plurality of substantially parallel filament laminate tip portions (such as 21A–26A, FIG. 5) that are bonded together to form the tip portion 11, FIG. 1. Each laminate tip portion of the plurality (such as representative single one 21A, FIGS. 4 and 5) includes: a lightweight metal matrix which, in turn, comprises two metallic foil sheets 21B and 21C, FIG. 4; a layer of generally elongated filaments (such are similarly designated 27, FIG. 4) which are anchored in the matrix formed by the foil sheets 21B and 21C; and, a preselected quantity of a resin (such as 31A, FIG. 3; and 31A–36A, FIG. 5) positioned in a cavity (such as 31, FIG. 4; and, 31–36, inclusive, FIG. 5) in the layer of filaments. In the preferred embodiment of the blade tip portion (11, FIG. 1; 11 and 21A, FIG. 4; and 21A–26A, inclusive, FIG. 5), the foil sheets which comprise the tip portion matrix are made of unalloyed aluminum (i.e., 1100 Al); the filaments are made of boron; and the resin is a polymeric adhesive.

It is to be noted that the composite blade 10, FIGS. 2 and 5 (of which the unique tip portion or region 11, FIG. 2, and 21A–26A, FIG. 5, is a constituent, and of which the root portion or region 12, FIG. 2, and 21B–26B, FIG. 5 is another constituent) preferably is a boron filament/aluminum matrix composite blade which comprises a plurality of substantially parallel filament laminates (such as 21–26, FIG. 5) bonded together, with each laminate including a tip portion matrix entirely of essentially unalloyed aluminum (i.e., 1100 Al), and a root portion matrix of essentially unalloyed aluminum (i.e., 1100 Al) and/or alloyed aluminum (i.e., 2024 Al or 5052 Al). The 2024 Al is nominally 4 wt. % copper, with the balance being aluminum alloy. The 5052 Al is nominally 0.25 wt. % chromium and 2.5 wt. % magnesium, with the balance being alloyed aluminum. Stated another way, the root region matrix 12 is preferably one which has a foil of 2024 Al or of 5052 Al disposed toward the pressure side surface 13A, FIG. 2, of the blade 10, and a foil of 1100 Al disposed toward the suction side 13B, FIG. 2, of the blade 10; whereas, the tip region matrix 11 has a foil of 1100 Al disposed toward the pressure side surface 13A, and also a foil of 1100 Al disposed toward the suction side surface 13B, of the blade 10. It must be remembered that, when a blade is impacted on one side (i.e., invariably the pressure side), it is the opposite side (i.e., the suction side) which is put into the greater tension.

DESCRIPTION OF THE INVENTIVE METHOD

As a preliminary matter, the reader is reminded that the inventive blade tip portion (11, FIG. 2; 11 and 21A, FIG. 4; and 21A–26A, inclusive, FIG. 5) is for use with a composite blade 10, FIGS. 2 and 5, which in turn is for use in a fluide flow machine. Additionally, it is to be noted that the contents of FIGS. 2 and 3 show, in their totality, the results of practicing the steps of the preferred method of making the blade tip portion of the composite blade.

The preferred method of making the blade tip portion of the composite blade 10, FIGS. 2 and 5, comprises essentially the below-listed steps.

Firstly, forming a plurality of substantially parallel filament laminates (such as 21–26, inclusive, FIG. 5, in which said figure only the filaments of one laminate 21 are shown in the interest of not encumbering the figuring) by bonding a layer of a plurality of generally elongated filaments (such as 27, FIGS. 4 and 5) between two sheets of metal material (such as 21B and 21C, FIG. 4).

Next, peeling back a portion of at least one sheet of the metal material (such as a portion of sheet 21B, as shown in phantom in FIG. 4, of tip portion 21A, FIG. 5) from each laminate (i.e., from 21–26, FIG. 5).

Then, forming a cavity (such as cavities 31, FIGS. 4 and 5, and 31–36, FIG. 5) in the layer of filaments of each laminate.

Next, filling each cavity 31–36 with a resin (such as resin 31A–36A, inclusive, FIG. 5, in, respectively, cavities 31–36, inclusive, FIG. 5). The resin can be injected into the cavities, such as by a conventional vacuum injection process. Preferably the same resin is used to fill each cavity.

Then, restoring (i.e., returning) the pulled back portion of the sheet of metal material to its original position.

Finally, bonding together, by suitable conventional means, the plurality of substantially parallel filament laminates 21–26, inclusive, FIG. 5.

As a result of practicing these steps, a tip portion 11 (of a composite blade 10) of great impact absorption capacity is formed.

It is to be noted that, as a matter of preference, the filaments used in this method are substantially of boron; that the metal material used in this method is either aluminum or an aluminum alloy (and, preferably, it is unalloyed aluminum 1100 Al); and, that the resin used is a polymeric adhesive.

It is also to be noted that, by a suitable choice of resin, a near optimized interply bond strength can be achieved for the blade's tip portion or region.

CONCLUSION

It is abundantly clear from all of the foregoing, and from the contents of the Figures of the drawing, that the stated objects, as well as related objects, of the invention have been achieved.

It is to be noted that, although there have been described and shown the fundamental and unique structural features of the inventive improved impact composite blade 10, FIGS. 2 and 5, (and of the tip thereof 11, FIG. 2, and 21–26, FIGS. 4 and 5), as applied to a preferred embodiment of each, various other embodiments, variations, adaptations, substitutions, additions, omissions, and the like may occur to, and can be made by, those of ordinary skill in the art.

Additionally, because of my teachings herein, it may occur to others of ordinary skill in the art that, in appropriate particular circumstances, the number of the basic and fundamental steps of my inventive method can be increased, decreased, or otherwise varied, and/or that their sequence can be changed. In this regard, it is to be noted that, in spite of any variations in the number or sequence of the steps of my method, the same desired results will be obtained, nevertheless.

What is claimed is:

1. A composite blade for use in a fluid flow machine, wherein said blade has a tip portion, a root portion, a pressure surface, and a suction surface, and wherein said blade comprises a plurality of substantially parallel filament laminates bonded together, with each said laminate including:

a. a root portion matrix in which are embedded a plurality of boron filaments, with said root portion matrix comprising an aluminum alloy foil sheet disposed toward said blade pressure surface, and an essentially unalloyed aluminum foil sheet disposed toward said blade suction surface, with said boron filaments sandwiched between said two foil sheets; and b. a tip portion matrix in which are embedded a plurality of boron filaments discontinued by a cavity having a resin therein, with said tip portion matrix comprising an essentially unalloyed aluminum foil sheet disposed toward said blade pressure surface, and another essentially unalloyed aluminum foil sheet disposed toward said blade suction surface, with said boron filaments and said resin-filled cavity sandwiched between these two foil sheets; and wherein said root portion matrix and said tip portion matrix are bonded together at a common interface;

and wherein said tip portion with said resin-filled cavity, and said root portion without a resin-filled cavity, have different impact absorption capabilities;

and also wherein different areas of said tip portion, because of said resin-filled cavity, have different impact absorption capabilities.

* * * * *